Feb. 6, 1951     M. ALDEN     2,540,081
FACSIMILE RECORDER
Filed Feb. 14, 1945     4 Sheets-Sheet 3
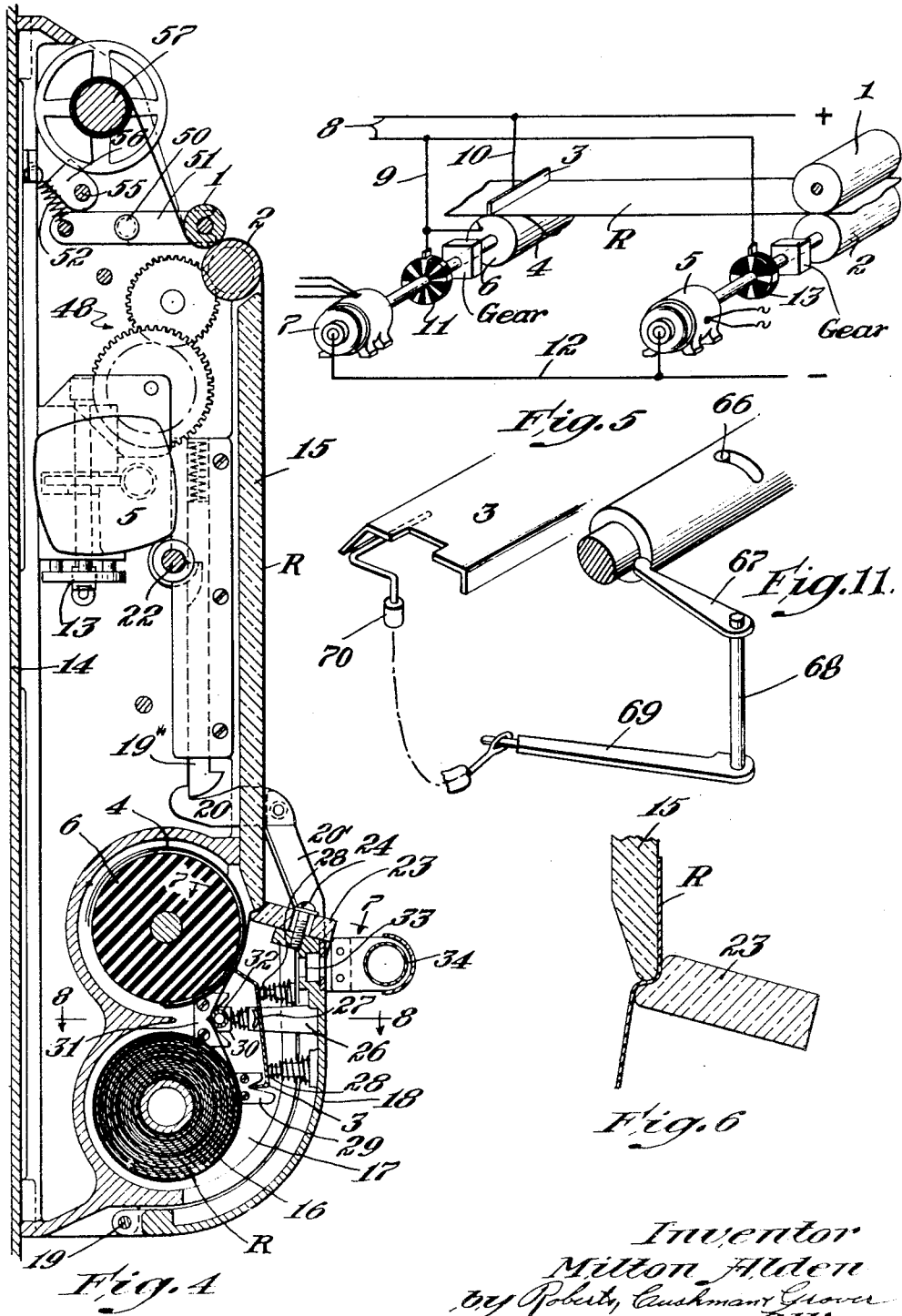
Inventor
Milton Alden
by Roberts, Cushman & Grover
Att'ys.

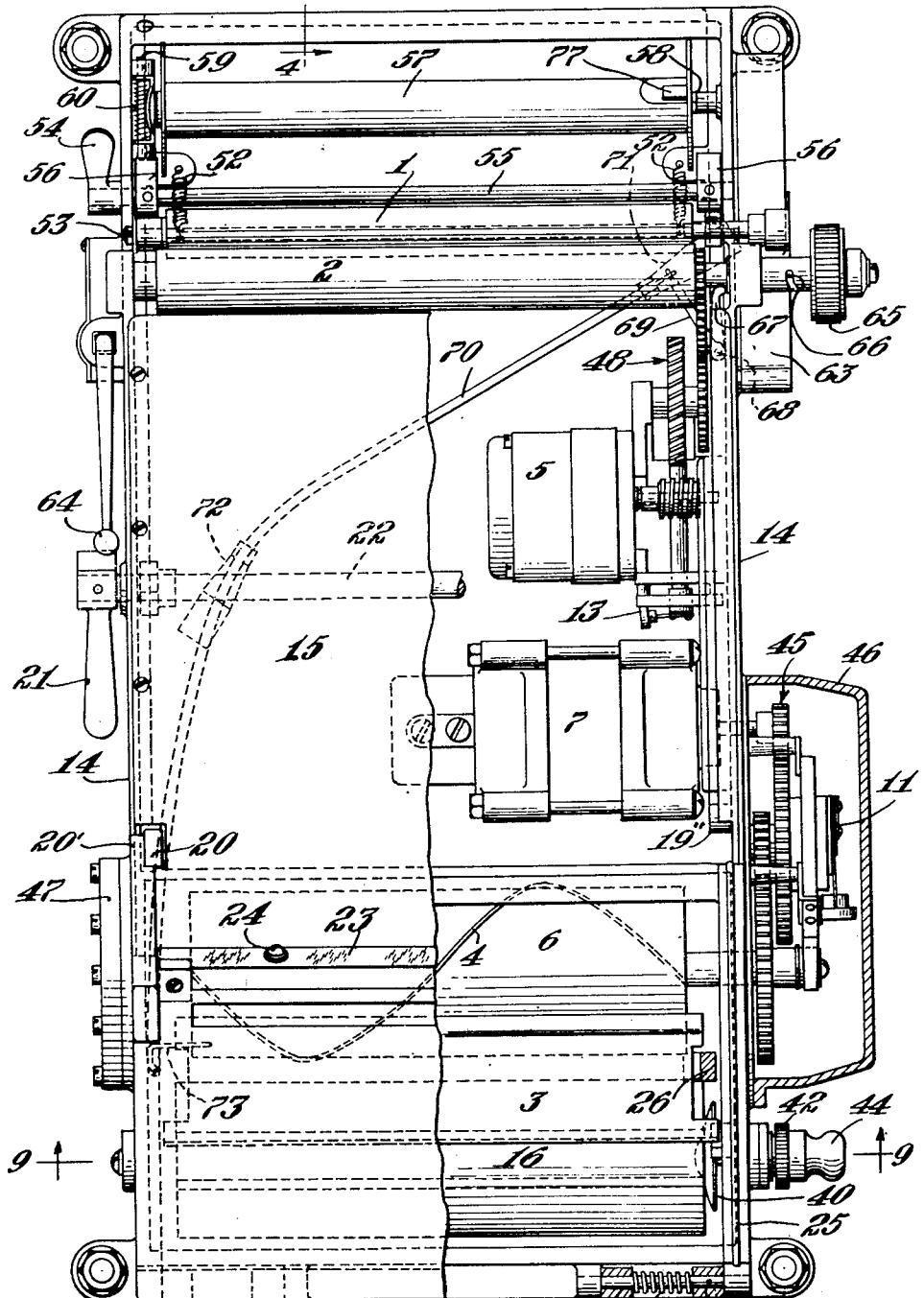

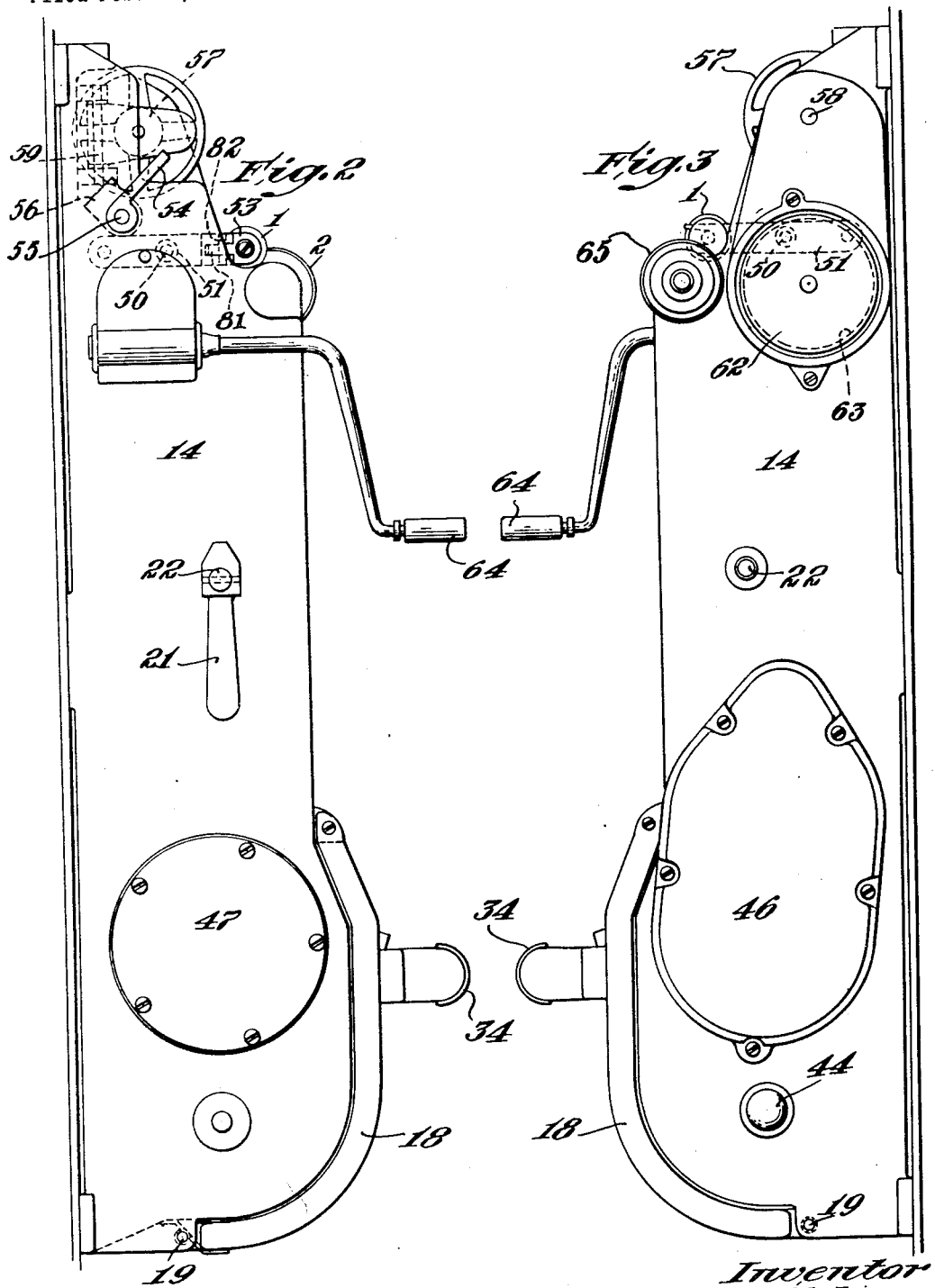

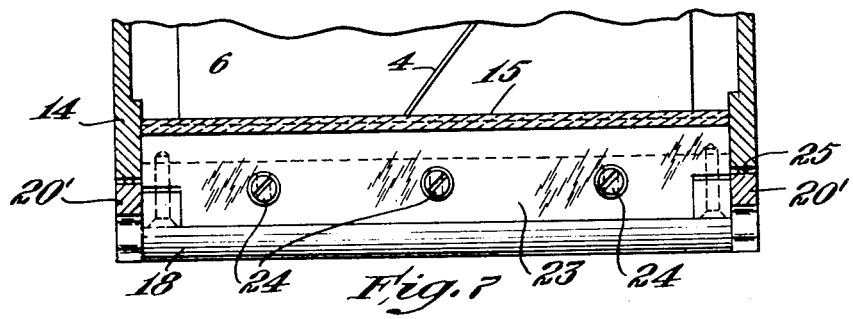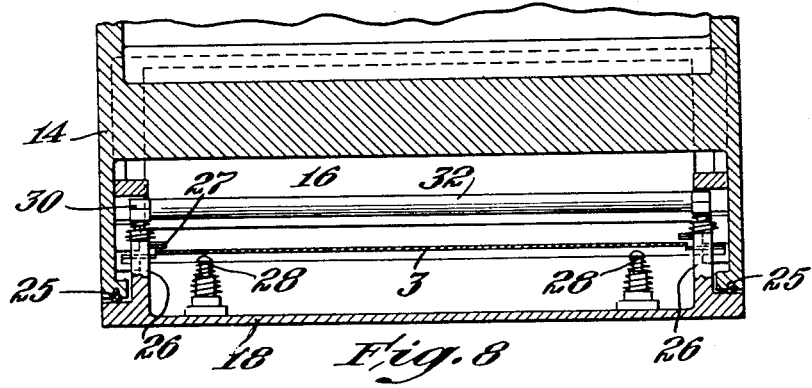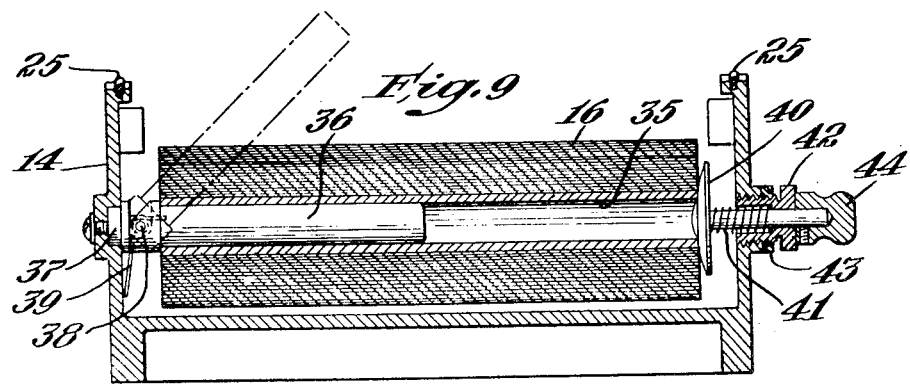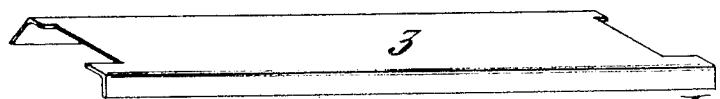

Patented Feb. 6, 1951

2,540,081

UNITED STATES PATENT OFFICE 2,540,081

FACSIMILE RECORDER

Milton Alden, Brockton, Mass.

Application February 14, 1945, Serial No. 577,754

9 Claims. (Cl. 346—74)

This invention relates to facsimile recorders and, in certain of its aspects, it relates to a recorder having means for feeding a tape of electro-chemical paper or other electro-sensitive sheet material along a predetermined path with opposed electrodes on opposite sides of the path for passing electric signals through the paper, one of the electrodes comprising a helix disposed spirally on a drum.

Objects of the invention are to provide a recorder in which the electro-sensitive paper may be kept in moist condition indefinitely, in which the paper is always in moist condition when it reaches the aforesaid electrodes, whether the machine be operated slowly or rapidly, continuously or intermittently, in which the supply of paper or other sensitive sheet material may be loaded quickly and easily, in which the paper is dried without wrinkles or distortions, in which the opposed electrodes are self-aligning, in which the tension on the feed roll may be adjusted from the outside, in which the marks on the paper are sharp and unblurred, and which is generally superior to facsimile recorders of the aforesaid type.

In one aspect the present invention involves a recorder comprising a tape housing having an opening through which the housing may be loaded with a supply of tape, a cover for the opening which is movable from an open position to a closed position in which it substantially closes the housing except for a slit between the cover and housing through which the tape may be fed from the housing, the housing having a space for holding a supply of tape in position to be fed through the aforesaid slit, and means inside the housing for recording data on the tape as it is fed from the supply to the slit. The recorder inside the housing is preferably of the type in which the effective point is moved back and forth across the tape in a line approximately parallel to the aforesaid slit, and in the preferred embodiment the electrode comprises a helix on a rotor having its axis approximately parallel to the slit. To facilitate loading, one of the electrodes is preferably mounted on the housing and the other on the cover, so that they automatically separate when the cover is opened. Preferably the tape supply comprises a roll pivotally supported to rotate about an axis approximately parallel with the aforesaid slit. To minimize friction on the paper the slit may be formed by opposed rollers mounted on the housing and cover respectively, but ordinarily it is preferable to let the paper rub over the opposed surfaces of the housing and cover which constitute the slit. To prevent the paper from wrinkling the housing and cover preferably have opposed surfaces which cause the tape to follow a tortuous path after it passes the recorder. For example the aforesaid slit may be curved in cross-section so that the tape follows a tortuous path as it is drawn through the slit. The housing and cover should closely surround the aforesaid roll and rotor so that the humidified space within the housing is restricted in volume. Another important characteristic of the invention comprises means for automatically aligning the two electrodes relatively to each other.

In another aspect the invention involves apparatus for recording electric signals on a tape of sheet material comprising a tape housing having a slit through which the tape may be fed from the housing, the housing having a space for holding a supply of tape in position to be fed through said slit, a recorder inside the housing for recording data on the tape as it is fed from the supply to the slit, and means for irradiating the tape immediately in advance of the recorder. Preferably the irradiating means comprises a light source located between the recorder and the aforesaid slit, the light shining on the paper tending to set the marks impressed on the paper and prevent them from blurring. In the preferred embodiment the irradiating means is located outside the housing, the radiant energy passing to the paper through a window in the housing.

In still another aspect the invention involves a shaft for rotatably supporting the roll of paper in the housing, the shaft being journaled and jointed near one end and the other end being free to swing toward the opening in the housing, together with a retractable pivot for the roll at the free end of the shaft. In the preferred embodiment the apparatus comprises an adjustable bearing for the pivot and means outside the housing for adjusting the bearing.

In still another aspect the apparatus comprises a feed roll, a handle for manually operating the feed roll, and means associated with the handle for automatically retracting one of the electrodes from the paper while feeding the paper by hand.

Still other aspects will be evident from the illustrative embodiment shown in the accompanying drawing in which:

Fig. 1 is a front elevation with a part of the cover broken away to show some of the interior mechanism;

Fig. 2 is a left side view;

Fig. 3 is a right side view;

Fig. 4 is a vertical sectional view;

Fig. 5 is a circuit diagram;

Fig. 6 is an enlarged section showing the aforesaid slit;

Fig. 7 is a section on line 7—7 of Fig. 4;

Fig. 8 is a section on line 8—8 of Fig. 4;

Fig. 9 is a section on line 9—9 of Fig. 1;

Fig. 10 is an isometric view of one of the aforesaid electrodes; and

Fig. 11 is an isometric view of the feed roll detail also shown in Fig. 1.

Referring first to Fig. 5 the particular embodiment of the invention chosen for the purpose of illustration comprises a pair of rolls 1 and 2 for feeding the tape R of electro-sensitive paper between the two electrodes 3 and 4, the feed roll 2 being driven by a constant speed motor 5 which is preferably of the synchronous clock type. The electrode 4 comprises a wire or other elongate conductor mounted helically on the drum 6 which is driven by a Selsyn motor 7. As more fully disclosed in copending application Serial No. 577,755, now abandoned, the Selsyn motor is controlled by a Selsyn transmitter associated with the transmitter from which the recorder receives signals over the transmission line 8, so that the drum 6 rotates in either direction, continuously or intermittently, in synchronism with the transmitter. The signals received over the line 8 flow through the conductors 9 and 10 and thence through the paper R across the short space intervening between the two electrodes 3 and 4. As the drum rotates the effective point of the helix 4 travels lengthwise of the blade 3, thereby tracing a path extending transversely of the tape. If the drum 6 rotates back and forth through 360 degrees the path traced on the paper by the effective point of the helix is a zig-zag path, and if the drum rotates continuously in the same direction the effective point of the helix traces parallel paths across the paper, the distance between the paths depending upon the speed of the feed roll 2. As disclosed in the aforesaid application it is sometimes desirable to transmit to the electrodes calibrating signals which are separated by intervals which depend upon the rotation of the drum 6. In the illustration this is effected by a commutator 11 on the shaft which connects the drum 6 with the motor 7, the current flowing between a suitable source of current indicated by the plus and minus signs through line 8, conductor 10, blade 3, tape R, helix 4, commutator 11, motor 7, shaft and conductor 12. Time indications may also be recorded on the tape of paper by means of a commutator 13 on the shaft of motor 5, current flowing from line 8 through conductor 10, blade 3, tape R, helix 4, conductor 9, commutator 13, line 8, shaft of motor 5 and thence to conductor 12 and source, at intervals depending upon the speed of the motor 5.

The parts are mounted in a housing 14 having a front 15 over which the tape R feeds from a supply roll 16 to the aforesaid feed roll 2. The housing has a compartment 17 shaped to fit closely around the drum 6 and the supply roll 16 so that the space in the compartment is restricted. This compartment has a cover 18 pivoted to the housing at 19 to swing somewhat more than 90 degrees from the closed position shown in the figures to open position wherein the recorder may be loaded with a roll of paper 16. The cover is urged toward open position by a spring 19' (Fig. 1) and retained in closed position by latches 19" engaging hooks 20 pivotally mounted on arms 20' of the cover at each side of the machine. The latches 19" may be retracted by means of a handle 21 on the left-hand side of the machine, the handle acting on the latches through a shaft 22 which has shoulders engaging shoulders on the latches as shown in Fig. 4. As shown in Figs. 4 and 6 the cover carries a bar 23 which has a concave edge conforming to the convex edge of the housing top 15 forming a tortuous passageway for the tape R, thereby to counteract the tendency for the tape to wrinkle as it passes from the humidified compartment to the outside of the casing. The spacing between the parts 15 and 23 may be adjusted by means of the screws 24. The crack between the housing 14 (Fig. 9) and the cover 18 (Fig. 4) is preferably sealed by a gasket 25 extending along the edge of the housing, as shown in Fig. 9.

The blade electrode 3 is yieldingly mounted on the cover 18 so that it moves away from the helix 4 to permit loading and threading when the cover is opened. As shown in Figs. 4 and 8 the cover has two posts 26 provided with ears 27 overlapping the ends of the blade 3 to lift the blade away from the rolls 6 and 16 when the cover is opened. The cover also carries four spring-pressed plungers 28 which yieldingly press the blade against the ears 27 when the cover is open. To remove the blade from the cover it is necessary merely to slip it edgewise from its normal position between the ears 27 and the spring-pressed plungers 28. The lower edge of the blade 3 is bent rearwardly at right angles and seats in notched bearings 29 on the inner faces of the sides of the housing, thereby automatically aligning the upper edge of the blade with the axis of roll 6. The parts may be adjusted so that, when the cover is closed, the upper edge of the blade lightly pinches the paper against the helix 4 or still rests against the ears 27 at a distance from the helix approximately equal to the thickness of the paper. The posts 26 also have V-shaped heads 30 which seat in V-shaped bearings 31 on the housing, the heads carrying a cross tube 32 which serves as a paper guide and the heads being mounted on the posts 26 by means of sliding plungers surrounded by springs which yieldingly press the heads 30 into the V-shaped bearings. Immediately above the operative edge of the blade 3 is a window 33 through which light radiates from a lamp 34 to the tape of paper immediately in advance of the operative edge of the blade 3.

As shown in Fig. 9 the roll 16 has a hollow core 35 adapted to telescope over a supporting shaft 36 whose length is approximately half that of the roll. The shaft 36 is journaled in the housing at 37 and is jointed at 38 and is provided with a spring 39 to swing it to the broken-line position shown in Fig. 9 for loading purposes. After a roll has been slipped over the upturned shaft the roll is swung down to the full-line position shown in Fig. 9 against the action of spring 39 and is held in this position by means of a bearing pivot 40 yieldingly pressed against the end of the roll by means of a spring 41. The bearing 42 for the pivot 40 is threaded into the housing so that it may be adjusted inwardly and outwardly and is held in position by a lock nut 43. The pivot 40 is provided with a head 44 on its outer end by which it may be retracted for loading purposes.

The Selsyn motor 7 is connected with the drum 6 through gearing 45 and the commutator 11 is associated with this gearing, these parts being located outside the housing 14 and enclosed in an auxiliary cover 46 (Fig. 1). The roll 2 is connected to the motor 5 through gearing 48 as shown in Figs. 1 and 4, the commutator 13 being associated with this gearing. The roll 6 may be removed through an opening in the left side of the housing which is closed by a cover 47 (Figs. 1 and 2).

The roll 1 which presses the tape R against the feed roll 2 is pivotally mounted at 50 on two arms 51, springs 52 being provided to urge the roll 1 toward the roll 2. The left end of the shaft of roll 1 is fast to a head 53 pivotally mounted on the associated arm 51 by means of a hinge tongue 81 and pin 82 and the other end of the shaft seats in the forked end of the other arm 51. Thus the roll 1 may be swung outwardly for threading purposes. The roll 1 may also be moved upwardly from roll 2 by means of a handle 54, shaft 55 and cam arms 56 fast to the shaft 55 and engageable with the rear ends of the arms 51.

After the paper passes between the rolls 1 and 2 it feeds to a pick-up roll 57 which is supported at the right end (Figs. 1 and 3) by a short stud shaft 58 extending into the roll a short distance and at the left end by means of a bearing which is pivotally mounted on shaft 59 and urged into engagement with the roll by means of a spring 60 (Figs. 1 and 2), the bearing having a recess to receive the convex end of the roll. The telescopic interconnection between roll 57 and shaft 58 is square in cross-section so that the shaft can drive the roll. The shaft 58 is driven by a spring motor 62 in the housing 63 on the right side of the housing, the spring motor being connected with the shaft 58 through gearing which is also enclosed in the housing 63. The spring 62 may be wound from time to time by means of a handle 64.

Sometimes it is desirable to operate the feed roll 2 by hand and for this purpose the shaft of the roll is provided with a knob 65. While rapidly feeding the paper by hand it is desirable to lift the printer bar 3 away from the paper and for this purpose the following mechanism is provided. Knob 65 is interconnected with the shaft of roll 2 through a pin and slot connection 66 (Figs. 1 and 11), the slot 66 being inclined so that the knob 65 moves axially toward the roll before it starts to turn the roll. During this axial movement the knob engages a lever 67 connected to shaft 68 which in turn is passed to an arm 69. The arm is connected to the end of a cable sliding in a sheath 70 supported by bearings 71 and 72. The other end of the cable 71 is connected to an arm 73 which actuates the printer bar 3. Just when the knob 65 is rotated in a clockwise direction (Fig. 3) it first moves inwardly a short distance to cause the arm 69 to push the cable 71 into the sheath 70, and this movement of the cable causes the arm 73 to swing the operative edge of the printer bar away from the paper so that the printer bar will not drag on the paper while it is being rapidly advanced. When the knob 65 is released a spring on the shaft 68 returns the parts to the normal position shown in Fig. 1.

To load and thread the recorder the cover 18 is opened, and the knob 44 is retracted, permitting the stub shaft 36 to spring out to the position shown by broken lines in Fig. 9. A paper roll is then telescoped over the shaft and swung down to the full-line position shown in Fig. 9, the knob 44 then being released to support the right end of the roll. Before the cover 18 is closed the end of the roll is pulled over the front of the housing 15 and thence between the rolls 1 and 2, roll 1 being swung out of the way by means of the pivoted head 53 (Fig. 2) and the end of the tape is secured to the take-up roll 57 by means of the spring clip 77 extending from the flange of roll 57. Then roll 1 is swung to its operative position shown in the figures and the cover 18 is closed. When the cover is closed the tube 32 presses the paper inwardly between the rolls 6 and 16 so that the paper feeds from 32 to the slit between parts 15 and 23 tangentially to the roll 6.

It should be understood that the present disclosure is for the purpose of illustration only and that this invention includes all modifications and equivalents which fall within the scope of the appended claims.

I claim:

1. Apparatus for recording electric signals on a tape of sheet material comprising a tape housing having an opening through which the housing may be loaded with a supply of tape, a cover for the opening which is movable from an open position to a closed position in which it substantially closes the housing except for a slit between the cover and housing through which the tape may be fed from the housing, the housing having a space for holding a supply of tape in position to be fed through said slit, a recorder in the housing for recording data on the tape as it is fed from the supply to the slit, the recorder including electrodes on opposite sides of the tape, one of said electrodes comprising a blade yieldingly mounted on the cover, and means on the housing for automatically positioning the blade relatively to the other electrode when the cover is closed.

2. Apparatus for recording electric signals on a tape of sheet material comprising a feed roll for feeding the tape along a predetermined path, electrodes on opposite sides of the path for transmitting current through the paper, an actuator for operating said feed roll, and means associated with said actuator for automatically retracting one of said electrodes from the paper while feeding the paper.

3. Apparatus for recording electric signals from a transmitter on a tape of sheet material comprising means for feeding the tape along a predetermined path, elongate electrodes extending edgewise of the tape on opposite sides of the path, one of the electrodes comprising a helix on a rotor, and means for driving the rotor in either direction either continuously or intermittently in synchronism with said transmitter.

4. A housing for a roll of tape and for apparatus for recording electric signals on said tape by means of a helix carrying rotor comprising a tape compartment having an opening through which the compartment may be loaded with a roll of tape, and a cover for the opening which is movable from an open position to a position in which it substantially closes the compartment except for an aperture passing said tape, one side of which aperture is formed by a portion of said cover and the other side of which is formed by a portion of said housing with said rotor, said portions being angularly arranged with respect to each other for sealingly confining the tape roll and the tape portion between the roll and the aperture when the tape passes through the aperture from the housing thereby to complete the sealing of said compartment thus preventing the tape from dehydrating.

5. A housing for a roll of electro-sensitive tape and for apparatus for recording upon said tape comprising a compartment shaped to fit closely around said apparatus and said roll, a cover for substantially sealing said compartment also shaped to said apparatus and said roll so that the space within said housing is restricted, and a bar projecting from said cover substantially normally to said housing thereby forming an aperture through which said tape is passed after unwinding from said roll to complete the sealing of said compartment thus preventing the tape from dehydrating.

6. A housing according to claim 5 wherein said bar is movable with respect to said housing thereby to adjust for tapes of varying thicknesses.

7. A housing for a roll of electro-sensitive tape and for apparatus for recording upon said tape comprising a compartment around said apparatus and said roll, a cover for substantially sealing said compartment and said roll so that the space within said housing is restricted, and a bar projecting from said cover substantially normally to said housing thereby forming an aperture through which said tape is passed after unwinding from said roll, said bar having a concave surface and said housing a mating convex surface thereby to provide a tortuous path for said tape.

8. A housing for a roll of electro-sensitive tape and apparatus including electrodes for recording upon said tape comprising a compartment, a cover substantially sealing said compartment except for an aperture between said cover and said housing through which said tape is passed after unwinding from said roll to complete the sealing of said compartment thus preventing the tape from dehydrating, and irradiating means located to dry said tape immediately upon emerging from said electrodes.

9. A housing for a roll of electro-sensitive tape and apparatus including electrodes for recording upon said tape comprising a compartment shaped to fit closely around said apparatus and said roll, a cover also shaped to said apparatus and said roll so that the space within said housing is restricted and substantially sealing said compartment except for an aperture between said cover and said housing through which said tape continues after passing between said electrodes to complete the sealing of said compartment thus preventing the tape from dehydrating, said cover having a window therein, and a lamp positioned contiguous the outer side of said window, said window being located so that said lamp irradiates the portion of said tape between said electrodes and said aperture.

MILTON ALDEN.

REFERENCES CITED

The following references are of record in the file of this patent:

UNITED STATES PATENTS

| Number | Name | Date |
|---|---|---|
| 980,279 | Ireland | Jan. 3, 1911 |
| 1,219,858 | Patterson | Mar. 20, 1917 |
| 1,300,191 | Pogue | Apr. 8, 1919 |
| 1,875,653 | Post | Sept. 6, 1932 |
| 2,099,955 | Edwards | Nov. 23, 1937 |
| 2,111,776 | Hogan | Mar. 22, 1938 |
| 2,134,043 | Hoppe et al. | Oct. 25, 1938 |
| 2,205,450 | Wise | June 25, 1940 |
| 2,227,109 | Shankweiler | Dec. 3, 1940 |
| 2,250,509 | Turner | July 29, 1941 |
| 2,391,765 | Artzt | Dec. 25, 1945 |
| 2,421,673 | Young | June 3, 1947 |